Figure 9:
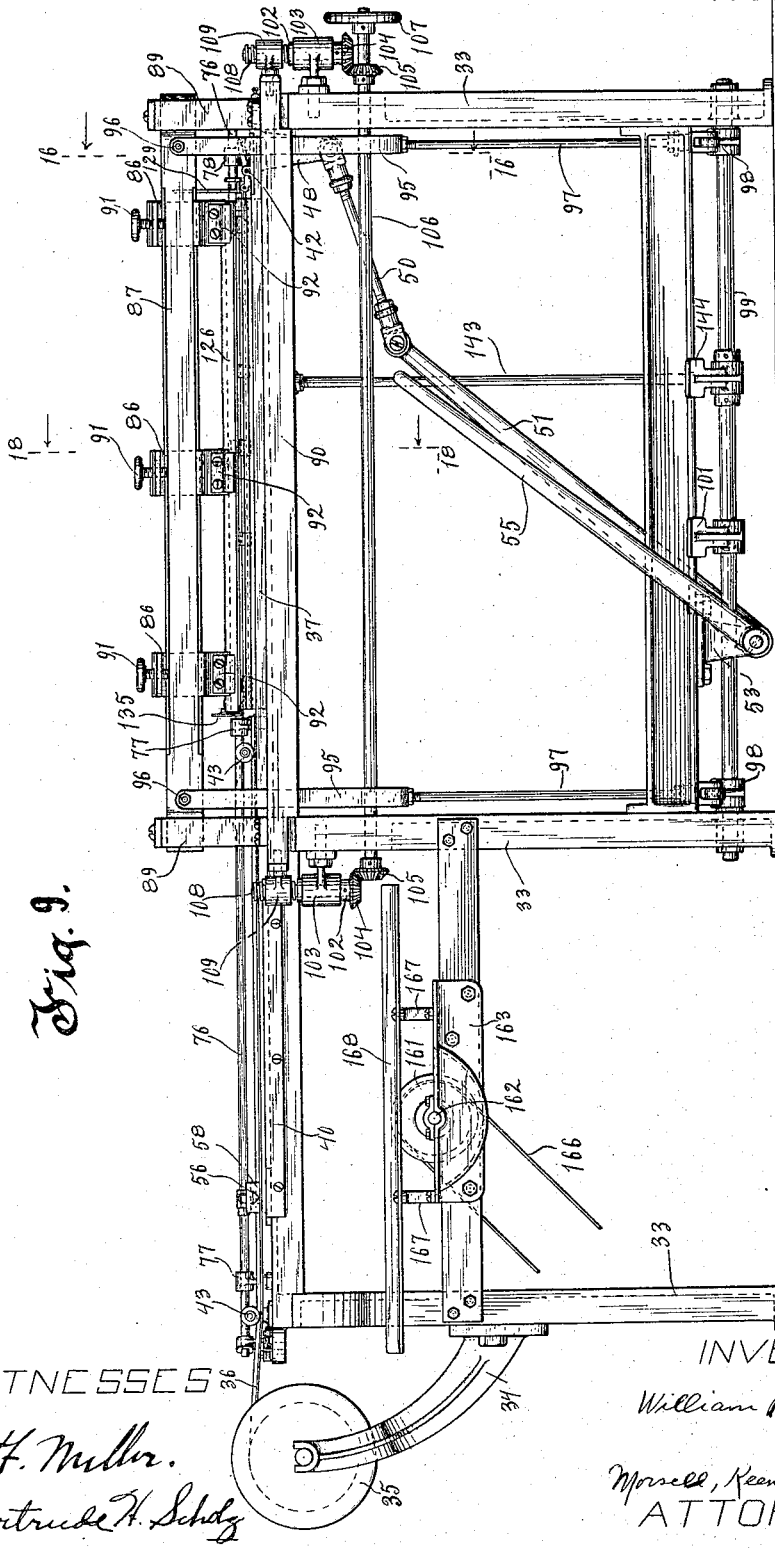

W. H. WYMAN.
MACHINE FOR INSERTING BINDING MATERIAL IN SASH.
APPLICATION FILED SEPT. 14, 1914.
1,166,960.
Patented Jan. 4, 1916.
7 SHEETS—SHEET 1.
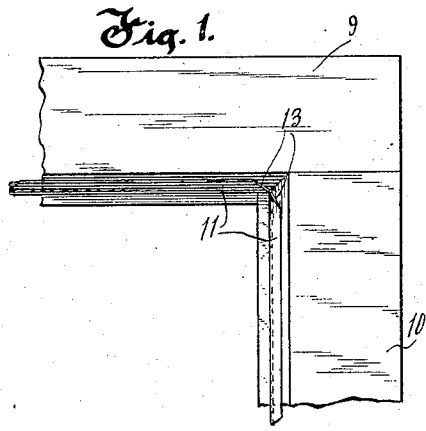
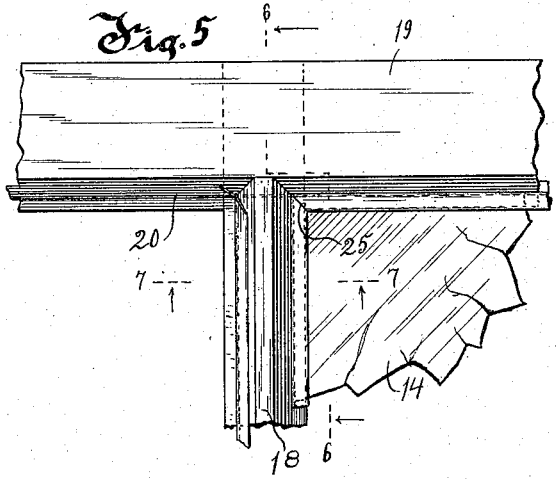
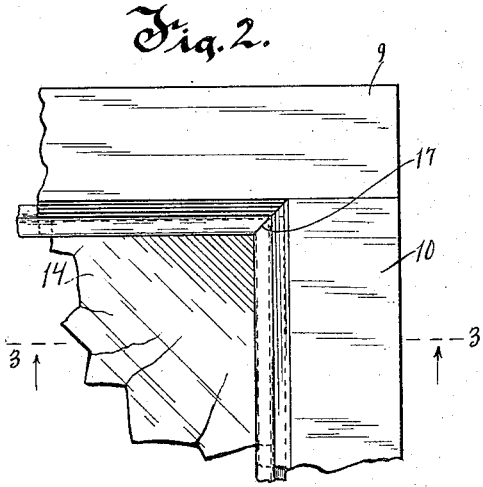
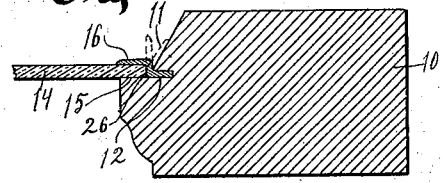
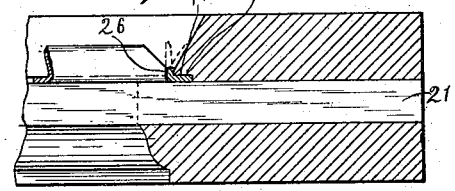
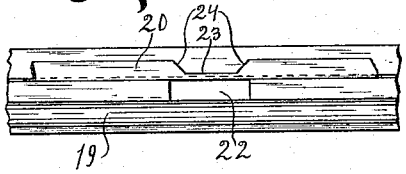
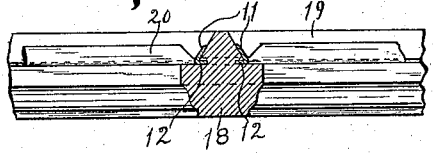
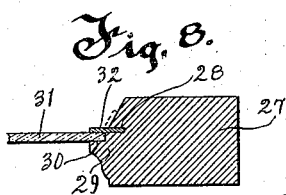
WITNESSES
INVENTOR
William H. Wyman
Morsell, Keeney & French
ATTORNEYS W. H. WYMAN.
MACHINE FOR INSERTING BINDING MATERIAL IN SASH.
APPLICATION FILED SEPT. 14, 1914.

1,166,960.

Patented Jan. 4, 1916.
7 SHEETS—SHEET 2.

WITNESSES
C. H. Miller.
Gertrude H. Schulz

INVENTOR.
William H. Wyman
Morsell, Keeney & Frensel.
ATTORNEYS.

W. H. WYMAN.
MACHINE FOR INSERTING BINDING MATERIAL IN SASH.
APPLICATION FILED SEPT. 14, 1914.

1,166,960.

Patented Jan. 4, 1916.
7 SHEETS—SHEET 3.

WITNESSES
C. F. Miller
Gertrude H. Scholz

INVENTOR
William H. Wyman

Morsell, Keeney & French.
ATTORNEYS

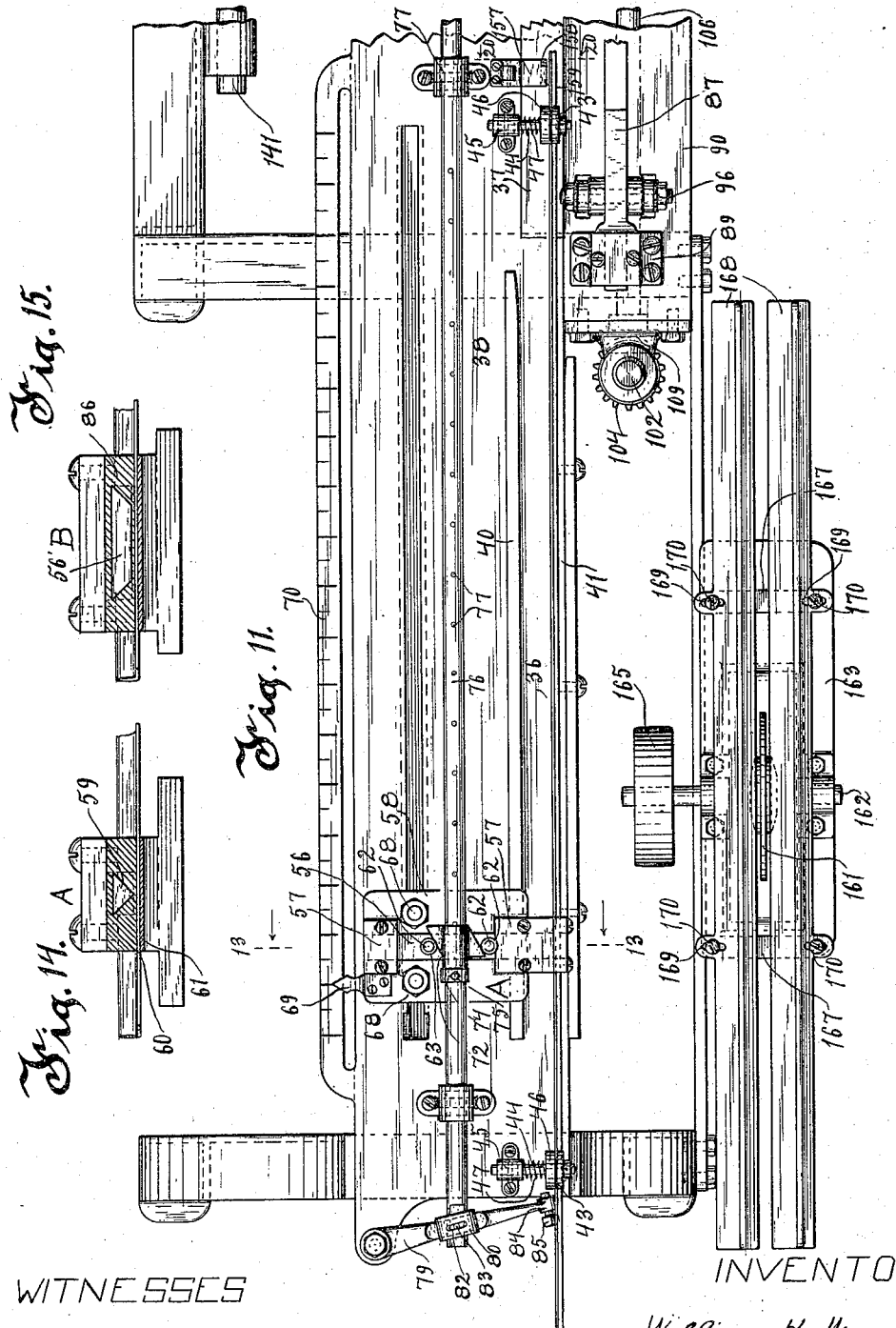

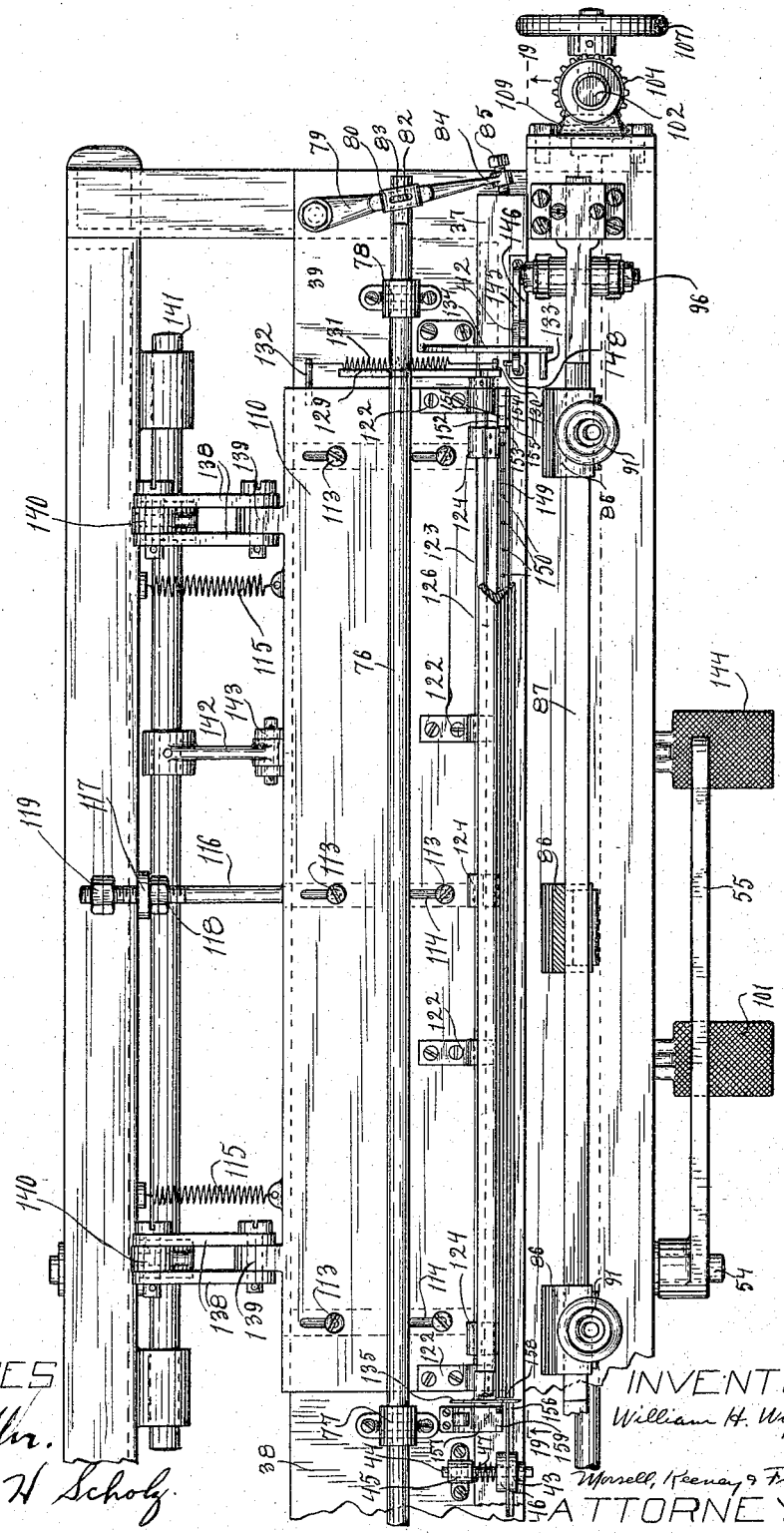

W. H. WYMAN.
MACHINE FOR INSERTING BINDING MATERIAL IN SASH.
APPLICATION FILED SEPT. 14, 1914.
1,166,960.
Patented Jan. 4, 1916.
7 SHEETS—SHEET 6.
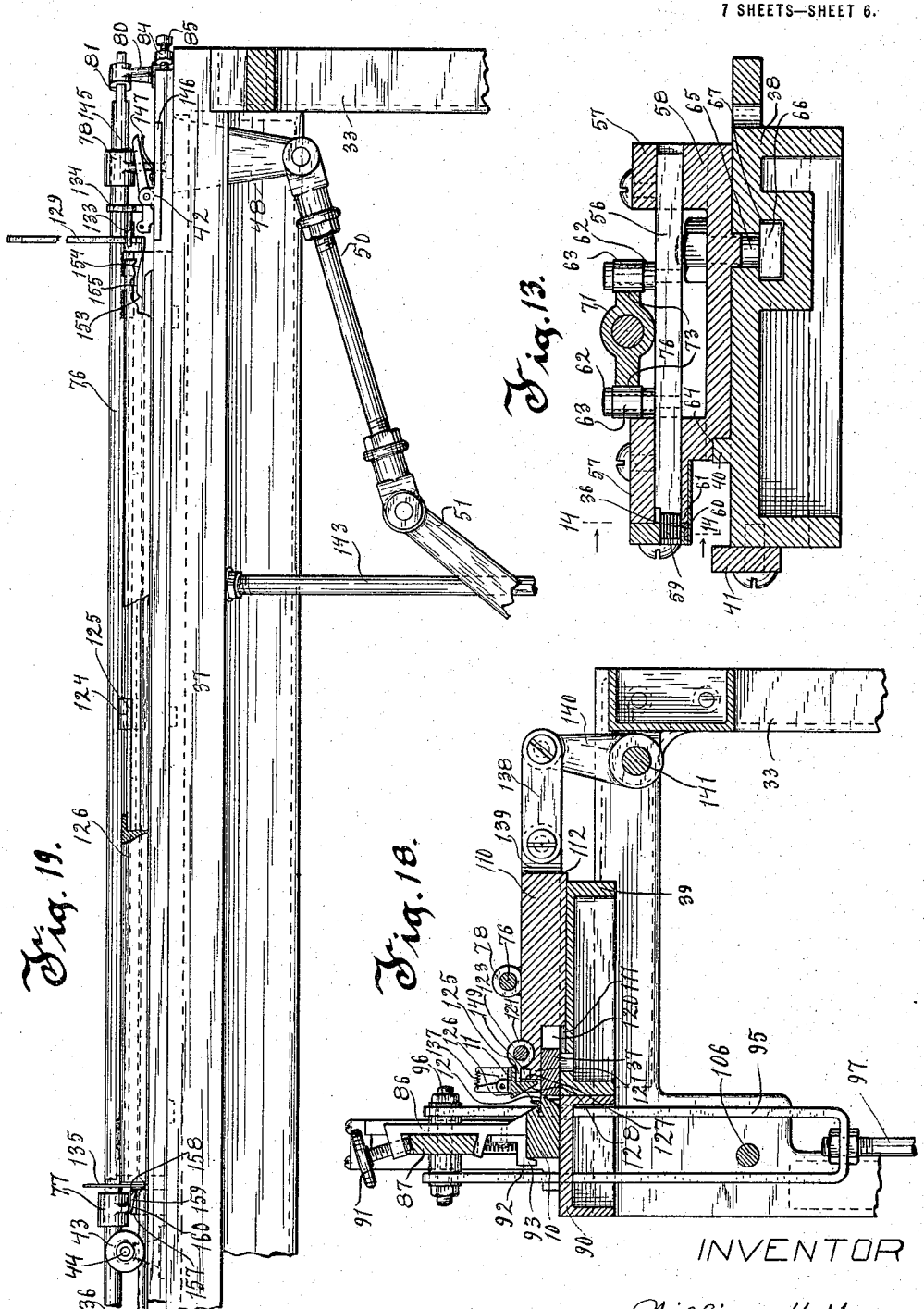
INVENTOR
William H. Wyman
Morsell, Keeney & French
ATTORNEYS W. H. WYMAN.
MACHINE FOR INSERTING BINDING MATERIAL IN SASH.
APPLICATION FILED SEPT. 14, 1914.
1,166,960.
Patented Jan. 4, 1916.
7 SHEETS—SHEET 7.
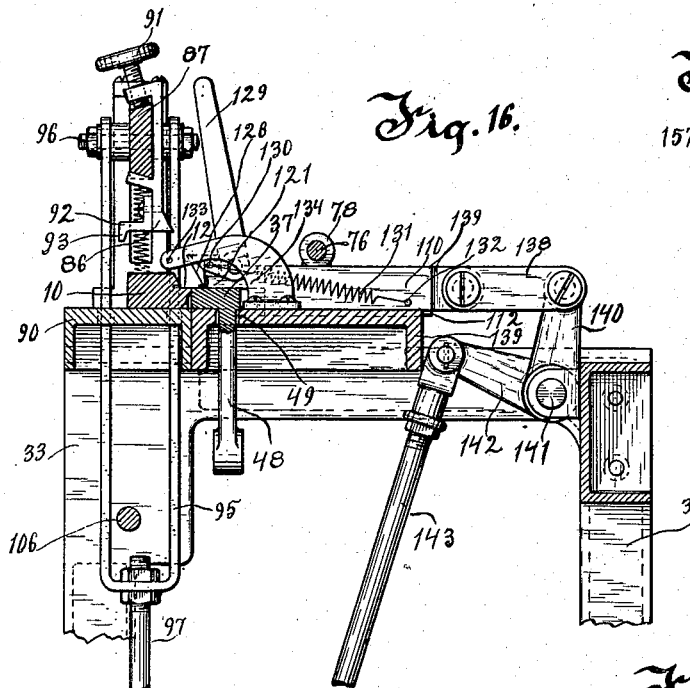
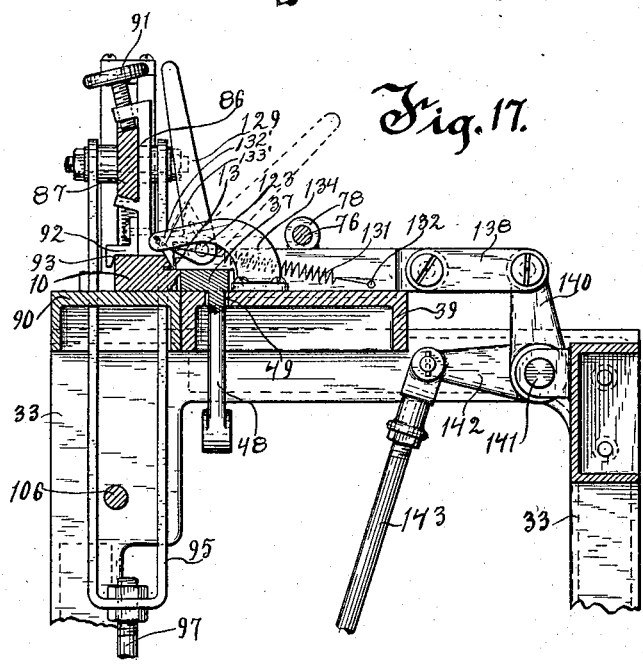
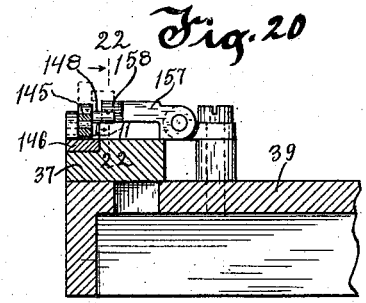
INVENTOR.
William H. Wyman
Morsell, Keeney & French
ATTORNEYS.
WITNESSES
C. F. Miller.
Gertrude H. Scholz.

UNITED STATES PATENT OFFICE.

WILLIAM H. WYMAN, OF OSHKOSH, WISCONSIN.

MACHINE FOR INSERTING BINDING MATERIAL IN SASH.

1,166,960.  Specification of Letters Patent.  Patented Jan. 4, 1916.

Application filed September 14, 1914. Serial No. 861,679.

*To all whom it may concern:*

Be it known that I, WILLIAM H. WYMAN, a citizen of the United States, and resident of Oshkosh, in the county of Winnebago and State of Wisconsin, have invented new and useful Improvements in Machines for Inserting Binding Material in Sash, of which the following is a description, reference being had to the accompanying drawings, which are a part of this specification.

The invention relates to machines for inserting binding material in sash.

The invention designs to provide more particularly a machine for inserting binding material in grooved pieces of sash-frame, in which a piece of binding material is forced into the groove, which material coöperates with the pieces of the sash-frame, to secure the glass or other material to the sash.

The construction of sash mentioned above is found in structure known as puttyless windows and doors, where formerly the metal or other binding material for securing the glass or other material to the sash frame, had to be inserted in the groove by hand, and it was to overcome this difficulty that this machine was devised, the machine accomplishing all the functions heretofore carried out by manual labor.

In the making of a sash frame for windows or doors it becomes necessary to miter the ends of the binding material at the corners where the sides of the sash frame meet, and it is one of the objects of this invention to cut the miter in the binding material, previous to its being inserted in the pieces of sash-frame.

It is also sometimes necessary to cut miters or notches intermediate the length of the binding material, where the window or door is made from built up sections, so that the binding material will not interfere with the insertion of the crosspieces of the sash frame, and it is a further object of this invention to provide mechanism for accomplishing this, previous to the insertion of the binding material in the groove in the pieces of the sash-frame.

The invention further designs to produce a machine of the character set forth, in which the binding material is cut into lengths corresponding to the length of the sash-frame, previous to its insertion in the grooves in the pieces of the sash-frame. In the making of this type of sash, after one side of the binding material is forced into the groove in a piece of the sash-frame, the other side is bent over against the side of said piece preparatory to the insertion of the glass or other material in the sash frame, and the invention further designs to provide means for accomplishing this purpose.

The invention further designs to feed, miter, cut and insert binding material in grooved pieces of the sash-frame of different lengths and thicknesses.

The invention consists in the several features hereinafter set forth, and more particularly defined by claims at the conclusion hereof.

Figure 10:
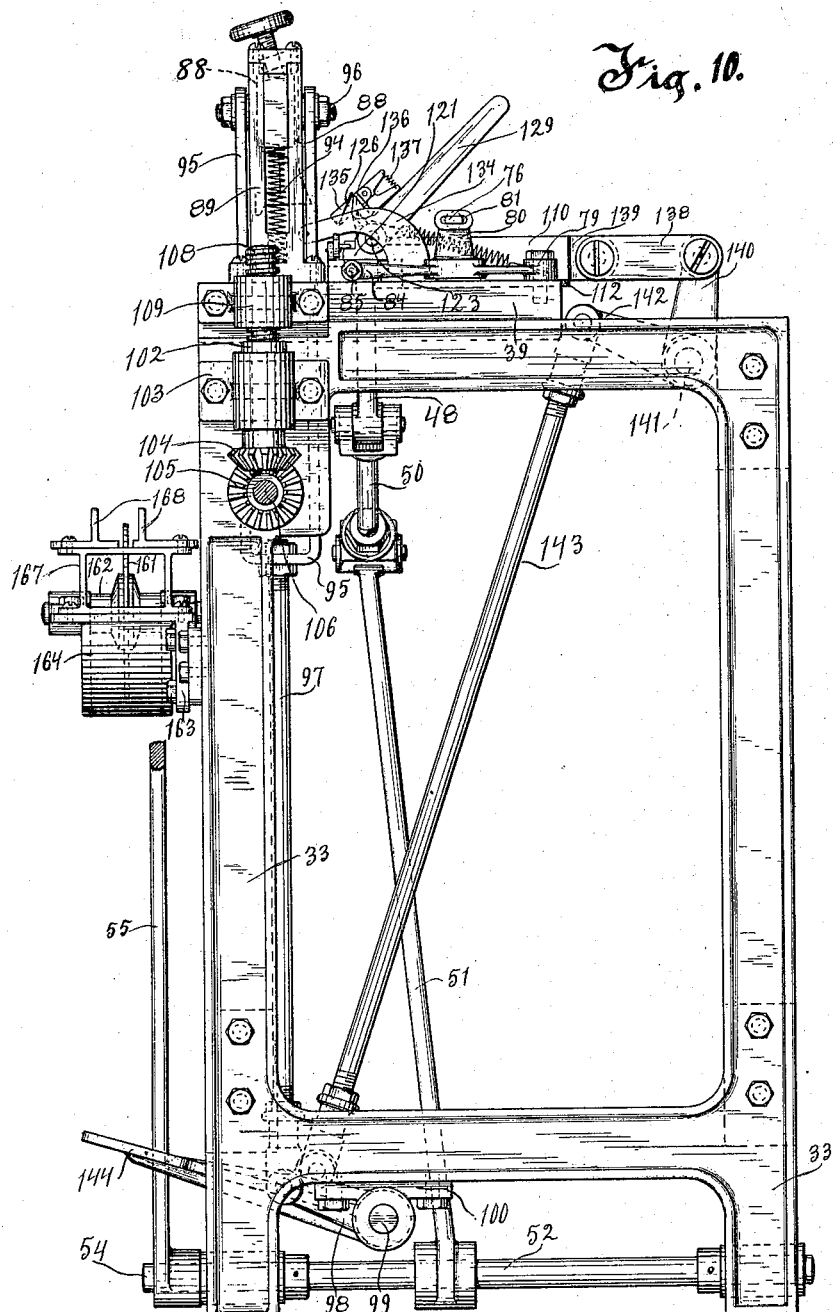

In the drawings: Figure 1 is a detail view of the sash frame with the binding material inserted therein; Fig. 2 is a detail view similar to Fig. 1, with the glass or other material in place; Fig. 3 is a section taken on the line 3—3 of Fig. 2; Fig. 4 is a detail view of a sash member; Fig. 5 is a detail view of the sash frame, showing the construction where cross members are employed; Fig. 6 is a section taken on the line 6—6 of Fig. 5; Fig. 7 is a section taken on the line 7—7 of Fig. 5; Fig. 8 is a modified form of sash-frame showing the binding material inserted therein, and the glass or other material in place; Fig. 9 is a side elevation of the machine embodying the invention; Fig. 10 is an end view thereof; Fig. 11 is a plan view of one end of the machine; Fig. 12 is a plan view of the other end of the machine being a continuation of the view shown in Fig. 11; Fig. 13 is a section taken on the line 13—13 of Fig. 11; Fig. 14 is a section taken on the line 14—14 of Fig. 13; Fig. 15 is a section similar to Fig. 14, showing a different form of notcher; Fig. 16 is a section taken on the line 16—16 of Fig. 9, showing the inserting mechanism in one extreme position; Fig. 17 is a section similar to Fig. 16, showing the inserting mechanism in the other extreme position; Fig. 18 is a section taken on the line 18—18 of Fig. 9; Fig. 19 is a section on the line 19—19 of Fig. 12; Figs. 20 and 21 are sections taken on the line 20—20 of Fig. 11, showing the mechanism in different positions; Fig. 22 is a section taken on the line 22—22 of Fig. 20.

In order that a clear understanding of the functions and purposes accomplished by the machine may be had, the resulting product will be briefly described. In Fig. 1, the sash frame members 9 and 10 are shown united to form the corner of the sash frame, and the binding material 11 is shown inserted in the groove 12 (see Fig. 3) in either sash-member, and it will also be noted, that the ends of the binding material 13 adjacent the corner of the sash, are mitered or cut at an angle, so that when the glass or other material 14 is inserted within the sash frame so that it seats upon the wall 15 of the rabbet, the outer edge 16 of the binding strip, may be bent over upon the glass or other material (as shown in Fig. 2), to secure the same within the sash frame, in which condition the ends 13 of the binding material at the corner of the sash, form the miter joint 17 (as shown in Fig. 2). When the sash frame is built up of a number of sections having cross pieces 18 (as shown in Figs. 5 and 7) intermediate the length of the frame, it is necessary to form the joints for the binding material at the corners formed by the cross pieces, and the sash member 19, in the same way as the corners of the sash shown in Figs. 1 and 2 are formed; but as the binding material 20 on the sash member 19 is inserted in one piece, it becomes necessary to notch said material where the cross piece 18 which has a tongue 21 which is inserted in the aperture 22 of the sash 19, joins the frame member 19, as shown in Figs. 4, 5 and 6, and accordingly a U-shaped notch 23 (see Fig. 4) is cut out of the strip 20 having angled edges 24, so that when the outer edge of the strip 20 is bent over to retain the glass or material in the sash frame, the ends of the binding material meet at the corners formed by the cross piece 18 and the sash member 19, as shown at 25 in Fig. 5. It will also be noted that the miter or angle cut is made so that a portion 26 forms a straight corner with the adjacent strip of binding material, so as to fit against the straight edges of the glass or other material. With this construction of sash the outer edge is bent over against the sash, as shown in dotted lines in Figs. 3 and 6, previous to inserting the glass within the sash frame. The binding material in this instance, is L-shaped, as shown in dotted lines in Fig. 6, previous to its insertion in the sash frame.

Fig. 8 also shows another construction in which a piece of sash-frame 27 has a groove 28 therein, and the wall 29 of the rabbet has a recess 30 for receiving the glass or other material 31. With this construction of sash-frame the binding material 32 is inserted in the groove 28, and is bent over against the sash-frame, as shown in dotted lines, previous to inserting the glass within the sash frame. In a construction of this kind the binding material may be L-shaped in cross section previous to its insertion in the glass, in which event it may be cut in the same way as in the other construction, or it may be flat, in which event the method of cutting the ends adjacent the corners of the sash-frame and the portion intermediate the length thereof, will be varied, so as to accommodate the flat-shaped strip.

With this preliminary explanation of the product, the machine for feeding, mitering, cutting and inserting the binding material in the grooved pieces of sash-frame, will now be described.

The machine comprises a frame 33 carrying brackets 34 upon which a spool 35 carrying the binding material 36 is rotatably mounted, and means are provided for feeding the binding material 36 from the spool 35. The feeding mechanism comprises a reciprocating carriage or bar 37 which is slidably mounted upon the supporting tables 38 and 39 forming a continuation of the table 38, carried by the frame 33. This carriage 37 moves between guides 40 and 41 on the table 38 adjacent the front end of the machine, and has mounted thereon means comprising a clamp 42 for releasably gripping one end of the binding material. The binding material which is unwound from the spool 35 is L-shaped in cross section, as shown in Figs. 16, 17 and 18, one side being parallel to the tables 38 and 39, and the other at right angles thereto, and means are provided for guiding the binding material over the table 38. This guiding means consists of rollers 43 rotatably mounted on pins 44 which are secured to brackets 45 mounted on the table 38, and rollers 46 are also rotatably mounted upon the pins 44, and are held in yielding engagement with the rollers 43 by the springs 47 which are mounted upon the pins 44 and interposed between the brackets 45 and the rollers 46. This construction permits the rollers 46 to move laterally upon the pins 44, so that the distance between the rollers 46 and 43 may be varied to form a groove, and so that the upright portion of the binding material may be yieldingly held within the groove so formed by each guide.

The carriage or bar 37 has mounted thereon at its forward end, a depending bracket 48 which is slidably movable within a guideway 49 on the table 39, and mechanism is provided for reciprocating the carriage 37 to move it forwardly and backwardly over the tables 38 and 39 forming the top of the machine. This mechanism for actuating the carriage consists of an adjustable link 50 which is pivotally mounted at one end to the lower end of bracket 48, and is pivotally secured at its other end to the upper end of a lever 51 which is rigidly mounted at its lower end on a shaft 52 which is suitably journaled in brackets 53 on the frame 33, and has an extension 54 upon which is mounted an operating lever 55. As a result of this construction when the lever 55 is moved toward the right or left, the shaft 52 will be turned, and cause the lever 51 and consequently the link 50, bracket 48 and carriage 37 to move toward the right or left. Though the actuating mechanism is shown as manually operated, it may be actuated by any suitable power means.

Having described the feeding means, its operation will be briefly explained. First, the lever 55 (shown in Fig. 9) is moved toward the left, causing the carriage 37 to move toward the left and on to the table 38 between the guides 40 and 41. The binding material is then inserted between the rolls 43 and 46 and pulled through and secured to the carriage at its forward end by the clamp 42. Under these conditions, the lower side of the binding material will rest upon the flat surface of the carriage 37, and then the lever 55 is swung over toward the right, moving the carriage 37 in the same direction, and carrying the binding material with it, causing it to unwind from the spool 35 and pass between the guide rollers 43 and 46.

As previously pointed out, it is necessary in the construction of sash of this kind, to miter or cut the ends of the binding material at an angle, so that when the pieces of the sash frame are joined together at the corners, as shown in Fig. 1, the binding material will form the joint 17 (as shown in Fig. 2), when the glass is in place. The mechanism for accomplishing this purpose comprising a notcher A, and means for actuating the same. The notcher consists of a reciprocating bar 56 which is slidably mounted in upstanding portions 57 of a bracket 58, the front end 59 of the notcher being V-shaped (see Figs. 13 and 14), and the front member 57 having a transverse groove or guideway 60 therein, adapted to conform to the shape of the binding material, and so that the flat side of the binding material will rest upon the side 61 of the guideway 60. A pair of pins 62 are secured to and project upwardly from the bar 56, having mounted thereon friction rollers 63. The bracket 58 is adjustably mounted upon the table 38, the forward end having a recess 64 for engagement with the guide 40, and a pair of bolts 65 having heads 66 slidably mounted in the recessed guideway 67 in the table 38. The bolts 65 carry nuts 68, so that the bracket 58 may be secured to the table 38 by tightening up the nuts 68. The bracket 58 also carries a pointer 69 which coöperates with a scale bar 70 secured to the table 38, whereby the bracket 58 may be moved to different positions along the scale-bar, so that notches may be cut at varying distances along the binding material.

The means for actuating the notcher comprises a block 71 having wedge shaped sides 72 with flat surfaces 73 which engage with the friction rolls 63 on the pins 62. This block 71 carries a collar 74 having a set screw 75 therein, and is slidably and adjustable mounted upon a longitudinally reciprocating rod 76 having recesses 77 therein for receiving the set screw to secure the block at different positions along the rod. The rod 76 extends the whole length of the machine, and is slidably mounted on the tables 38 and 39 respectively. Levers 79 are pivotally mounted at both ends of the machine on the supporting table thereof, and carry brackets 80 intermediate their lengths, having apertures 81 therein for receiving the ends of the rod 76, and slots 82 for receiving pins 83 on the ends of said rod. The forward ends 84 of the levers 79 carry screws 85 adjustably secured therein, which screws are adapted to be struck by the end of the carriage 37 adjacent thereto, when said carriage reaches its extreme movement at either end of the machine.

The operation of the notcher is as follows: The binding material is inserted between the rolls 43 and 46 in the first guide roll, and then through the transverse guideway 60 in the notcher, thence between the rolls of the second guide, and is then secured to the carriage by the clamp 42 when the carriage is in its extreme left position. Now the carriage is shifted by the lever 55 to its extreme right position moving from the table 38 to the table 39 which forms a continuation of the table 38, and at the end of its movement strikes against and moves the lever 79 at this end of the machine outwardly, which results in a forward movement of the rod 76 and the block 71, which causes the rod 56 to be moved forwardly in the brackets 57 against the upright side of the binding material, and to cut a V-shaped notch therefrom. On the return stroke of the carriage, the other end of the carriage strikes the lever 79 on the table 38, and causes the rod 76 and block 71 to move back and consequently the backward movement of the bar 56 away from the binding material.

As previously pointed out, it is sometimes necessary to cut a U-shaped notch intermediate the ends of the strip of the binding material, to accommodate for the cross pieces 18 of the sash frame, as shown in Figs. 4 and 5, in which case an additional notcher B similar in all respects to the notcher A, except that its bar 56' cuts from the upright portion of the binding material a U-shaped groove 23, as shown in Fig. 4, is mounted upon the bar 76 at the desired point. This notcher B, like the notcher A, is adjustable with respect to the table 38, and is actuated in the same way.

Previous to the insertion of the binding material within the groove in the sash, the sash member must be positioned adjacent the table 39, and suitably held during the inserting operation.

The means for holding the sash member in position comprises a plurality of clamping brackets 86 adjustably mounted on a bar 87 which is slidably mounted in guideways 88 in the brackets 89 which are mounted upon a vertically adjustable table 90 adjacent the table 39, and means are provided for elevating and depressing the bar 87 and brackets 86 to clamp a piece of the sash-frame in position upon the table 90. Each bracket 86 has a U-shaped portion engaging the bar 87, and a hand screw 91 rotatably mounted in its upper end adapted to engage the upper side of the bar 87. An additional bracket member 92 having a depending flange 93 is adjustably secured to the lower end of the bracket 86, to accommodate for different widths of pieces of sash-frame (see Fig. 17). The bar 87 is kept in a normally elevated position by means of springs 94 which are seated in the brackets 89, and means are provided for depressing the bar 87 against the action of said springs, consisting of yoke members 95 pivotally secured adjacent either end of the bar 87 by bolts 96, and having rods 97 adjustably connected at their transverse positions, which rods are connected at their lower ends to crank arms 98 mounted upon a shaft 99 which is suitably journaled in brackets 100 on the frame 33, which shaft carries a foot pedal 101. It is obvious that a downward pressure exerted upon the pedal 101 will rotate the shaft 99 and cranks 98, and consequently move the rods 97, yokes 95, bar 87 and brackets 86 downwardly, to clamp the sash in position upon the table 90, as shown in Figs. 17 and 18.

In view of the fact that the machine must operate on sash of different thicknesses, and that for inserting the binding material 11 the lower side of the groove 12 must be in line with the upper surface of the carriage 37 (see Fig. 16) means are provided for adjusting the position of the table 90 with respect to the carriage 37 and the table 39. This table adjusting means comprises a pair of shafts 102 suitably journaled in brackets 103 secured to the frame 33 carrying bevel gears 104 at their lower ends, which mesh with bevel gears 105 secured to a shaft 106 journaled in the frame and carrying a hand wheel 107. The upper ends 108 of the shafts 102 are provided with screw threads which register with the screw threaded apertures in the brackets 109 secured to the table 90, so that the rotation of the shaft 106 by means of the hand wheel 107 will turn the shafts 102 through the gears 104 and 105, to cause the upward or downward movement of the brackets 109 upon the shafts 102, to elevate or depress the table 90 with respect to the table 39 and the frame 33.

It will be noted that manually operable means have been shown for elevating and depressing the sash holding means and the table 90, but it will be evident that any suitable power means could be used in place of the pedal 101 and the hand-wheel 107.

The mechanism for cutting off the binding material to the required length, and inserting it within the groove in a piece of the sash-frame will now be described. This mechanism consists of a plate 110 which is slidably mounted upon the table 39 so as to reciprocate transversely thereacross, said table having transverse slots 111 in which downwardly projecting portions 112 of the plate 110 fit. A plurality of screw bolts 113 are secured to the table 39 and project upwardly through slots 114 in the plate 110, said bolts tending to keep the plate 110 in contact with the table 39. A pair of springs 115 are each fastened at their ends to the plate 110 and the frame 33 respectively, and a threaded rod 116 is secured at one end to the plate 110 and passes through an aperture in a bracket 117, and having nuts 118 and 119 adjustably secured on its threaded end, the bracket being interposed between each set of nuts, whereby the movement of the plate 110 with respect to the table 39 will depend upon the distance between the sets of nuts 118 and 119.

The plate 110 at its forward edge is provided with a longitudinally extending recess 120, whereby the plate may be moved so that the carriage 37 may reciprocate in this recess, and so that the forward edge 121 of said plate may extend over the carriage 37 and move transversely thereto (see Figs. 16, 17 and 18). Mounted upon the top of the plate 110 are a plurality of brackets 122 in which is journaled a longitudinally extending shaft or rod 123 to which are rigidly secured a plurality of brackets 124 having extensions 125 which carry a longitudinally-extending clamping and bending member 126 having a straight side 127 which meets a beveled or angled side 128 (see Fig. 18). A hand lever 129 is secured to one end of the shaft 123 and carries a pin 130 to which one end of a spring 131 is connected, the other end of said spring being fastened to the pin 132 in the end of the plate 110. When the hand lever 129 is operated against the action of the spring 131 to turn the shaft 123, the brackets 124 and the member 126 being rigidly connected thereto, will be turned so that the member 126, when the lever 129 is in the position shown in Fig. 17, will be in the position shown in Figs. 16, 17 and 18. Normally, the lever 129 will be in the position shown in dotted lines in Fig. 17, but when it is pushed over to the position shown in full lines, it will remain so unless otherwise acted upon, as the pin 130 is eccentrically mounted with respect to the shaft 123 and in such relation thereto that it will pass beyond the apex of its movement before it is stopped. Under some conditions hreinafter described, the lever 129 is automatically operated, and for this purpose the lower end of the lever 129 has a beveled extension 132', the beveled side 133' of which is adapted to engage a pin 133 secured to a bracket 134 which is mounted upon the table 39, said beveled side riding up on the pin 133 as the plate 110 moves forward, thereby swinging the lever 129 upwardly out of its eccentric position, so that the spring 131 will pull the lever 129 backwardly, and consequently the member 126.

The means for cutting the strips of the binding material into lengths, comprises a knife 135 which is pivotally secured in a bracket 136 adjacent one end of the clamping and bending member 126, its upper end being connected to the upper end of the bracket 136 by a spring 137, for reasons hereinafter set forth. As the knife 135 is directly connected to the member 126, it will move with it, when the lever 129 is operated.

The mechanism for reciprocating the plate 110 comprises pairs of links 138 which are pivotally connected to lugs 139 on the plate 110, and also to crank arms 140 mounted on a shaft 141 suitably journaled in the frame 33, which shaft carries a lever arm 142 which is pivotally connected to an adjustable link or connecting rod 143 which is pivotally mounted at its lower end to a foot lever 144 and eccentrically mounted with respect to the shaft 99 (see Fig. 10), said lever 144 being free to turn on the shaft 99. The downward movement of the pedal 144 will actuate the bell-crank levers 140 and 142, and the links 138, causing the plate 110 to move forwardly against the action of the springs 115.

As the machine is designed to insert binding material into the grooved pieces of sash-frame, of varying lengths, and to operate continuously, mechanism is provided for automatically operating the clamp 42. The clamp 42 consists of a movable jaw member 145 which is pivotally secured to a fixed member 146, said jaw member being normally held in clamping position by means of a spring 147, and a laterally extending pin 148 is secured in said jaw 145. Means are provided for tripping the clamp 42 to free it from engagement with the binding material at any point along the length of the plate 110, and for this purpose said plate is provided with a longitudinally extending groove 149 in the upper surface of the end 121 of said plate, which groove is provided with a plurality of holes 150 into any one of which a pin 151 which is secured in a tripping block 152, may be inserted. The tripping block 152 has beveled sides 153 and 154, and a straight portion 155, and the laterally projecting pin 148 is adapted to ride on these beveled sides. When the pin 148 strikes the side 153 the front end of the jaw member 145 will be raised upwardly. Thus when the carriage 37 is moving toward the right, carrying the binding material with it, the end being held by the clamp 42, and the pin, striking the side 153, rides up on it, the jaw member 145 will be released from engagement with the binding material. The feed clamp release will operate before the notching mechanism engages as the tripping block 152 is placed upon the plate 110 in the groove 149 which plate does not extend as far as the travel of the carriage 37 so that the block will trip the clamp before the end of the carriage strikes the lever 79 to actuate the notching mechanism.

As the knife severs the binding material from the continuous strip when the carriage 37 has fed a predetermined length of said material to a position adjacent the plate 110, means are provided for automatically operating the clamp 42 to grip the end 156 of the material adjacent the severed end, so that the next length may be brought into position, which consists of a block 157 pivotally mounted on the table 38, and having an upwardly beveled side 158, a straight portion 159 and a downwardly beveled portion 160. When the carriage 37 is moved toward the left, the pin 148 will ride up on the beveled side 158, causing the jaw member 145 to be raised, (see Figs. 20 and 22), and will then ride upon the straight portion 159 of the block 157, under which conditions the end 156 of the binding material will rest upon the fixed jaw member 146, and when the pin 148 has moved past the block 157, the spring 147 will move the jaw 145 downwardy, causing the binding material to be gripped between the jaws 145 and 146. In this condition the carriage 37 is moved forwardly toward the right and the pin 148 coming in contact with the beveled side 160, lifts the block 157 upwardly, causing it to swing on its pivot. (See Fig. 21.)

Though it has been found that the binding material may be inserted in the grooved pieces of sash-frame without using any adhesive, under some conditions this may be necessary, and for this purpose means have been provided for inserting adhesive within the groove, which consists of a feeding wheel 161 mounted upon a shaft 162 which is journaled in brackets 163, which forms a trough 164 within which the lower half of the wheel 161 operates. A pulley 165 is mounted on the shaft 162, and a belt 166 runs over said pulley and may be driven by any suitable power means. A pair of upright brackets 167 are mounted upon the trough 164 and carry a pair of longitudinally extending guides 168 having transverse slots 169 through which bolts 170 pass, to permit of varying the distance between the guides 168, to accommodate for different thicknesses of sash.

In practice, a piece of sash-frame is placed in the guide, grooved side down, so that the periphery of the wheel 161 engages in said groove, under which conditions, during the rotation of the wheel, the adhesive in the trough carried up by the wheel 161, will be deposited in the groove in the piece of sash-frame as said piece is moved along the guides.

Previous to a continuous operation of the machine, the end of the binding material 36 is brought through the notcher A, which is then operated by hand by pulling the rod 76 forward to cut a notch therein. Then the material is brought through the notcher A, and in case the notcher B is used through it, each of said notchers being previously adjusted on the table 38, to cut notches in the binding material at predetermined distances, and between the guide rolls 43 and 46, till the end is brought to a position adjacent the knife 135, which is then operated by the handle 129 to cut through the material at the notch. Then the notcher A is again operated by hand, after which the machine is ready for continuous operation, which is as follows: The operator moves the handle 55 toward the left, causing the carriage 37 to move in the same direction, and passing under the bottom of the strip during its movement. Just before the carriage reaches its extreme left position, the pin 148 rides up on the inclined side 158 and along the straight portion 159 of the block 157, during which time the end of the carriage strikes the end 84 of the lever 79, causing the rod 76 to move backwardly and the notcher bar 56 to do likewise. When the pin 148 moves away from the block 157, the spring 147 moves the jaw 145 downwardly, causing the end of the binding material to be gripped between the jaws 145 and 146 of the clamp 42, on the carriage. Now the operator moves the lever 55 to the right, consequently moving the carriage in the same direction, which carries the binding material along with it, said material being unwound from the spool 35. The binding material is carried along until the pin 148 of the clamp 42 strikes the inclined side 153 of the strip 152, which has been set in the plate 110 at a predetermined distance from the knife, causing the jaws of the clamp to release their hold of the binding material, after which the movement of the carriage toward the right is completed. Before completing its movement to the right, the front end of the carriage strikes the end 84 of the lever 79, moving the bar or rod 76 forwardly, which in turn operates the notcher A, or both notchers A and B, to cut a second notch or series of notches in the binding material. At this time the first length of material which has been previously notched is now in position adjacent the table plate 110 (see Fig. 16). The piece of sash-frame which may have been previously placed upon the guides 168 and run over the wheel 161 that suitable adhesive may be applied to the groove, is now placed upon the table 90 which is adjusted as previously pointed out, to accommodate for the thickness of a piece of the sash-frame and a lever 101 is then operated to cause the descent of the bar 87 and the clamping brackets 86 carrying the member 92, which member 92 has been previously adjusted to accommodate for the width of the piece of sash-frame, which results in the clamping of said piece in position upon the table 90, so that the lower side of the groove 12 in the piece of sash-frame is in line with the upper surface of the carriage 37 (see Fig. 16). Then the operator throws the lever 129 forwardly, causing the clamping and bending member 126 to clamp the upright portion of the strip of binding material between its side 127 and the outer edge 121 of the plate 110, and at the same time moving the knife 135 downwardly to sever the end of the strip adjacent the notch (see Fig. 16). Under these conditions the operator keeping the pedal 101 under pressure to hold the piece of sash-frame in position, now operates the pedal 144 which causes the plate 110 to move transversely across the table 39 against the action of the springs 115, carrying the strip of severed binding material with it, and moving it across the carriage 37 until its bottom side is inserted in the groove 11 in the piece of sash-frame (see Fig. 17). On a further movement of the plate 110 the beveled end 130 of the lever 129 strikes the stop pin 133 on the bracket 134, rides up on it and throws it backwardly, the spring 131 now assisting its movement and throwing it back to the dotted line position shown in Fig. 17. This results in the upward movement of the member 126 releasing it from clamping engagement with the binding material. The pedal 144 is then relieved from pressure, causing the springs 115 to carry the plate 110 backwardly, the stop nuts 118 and 119 on the rod 116 attached to the table determining the distance of travel of the table. After this the lever 129 is again moved forward and pressure applied to the pedal 144, causing the table 110 to move forwardly as before, under which conditions the beveled side 128 of the member 126 now engages the outer side of the upright portion of the severed binding strip, pushing the strip farther into the groove, until the bottom side is entirely seated therein, after which the farther movement of the plate 110 and the member 126 causes the upright portion of the strip to be bent against the inclined wall of the rabbet of the piece of sash-frame, due to the inclined contacting surface of the side 128 of the member 126, and a farther movement of the plate causes the end of the lever 129 to again strike the pin 133, and to be thrown backwardly as before, leaving the bottom portion of the binding material inserted in the piece of sash-frame and the upright portion bent down upon said piece, after which the pressure on the pedal 101 is relieved and the piece of the sash-frame removed from the machine. The knife member 135 has been previously described as provided with a spring 137, which permits a movement of the knife, and thereby prevents its injuring the end of the piece of the sash-frame during the insertion of the binding material. After the first strip of binding material is inserted in the piece of sash-frame, the lever 55 is swung to the left causing the carriage to move in the same direction, and before reaching its extreme left position the pin 148 of the clamp 42 rides up on the beveled side 158 and the straight side 159 of the block 157, moving the jaw 145 upwardly, the end 156 of the binding material now being in position on the jaw 146, and as the pin 148 moves off the block 157, to permit the jaw member 145 to be moved downwardly by the spring 147, to grip the end of the binding material, the rear end of the carriage strikes the lever 79, and moves the rod 76 backwardly, thus moving the notcher bar of the notcher A, or the notcher-bars of both A and B out of the notches previously cut during the forward travel of the carriage 37, with the first length of strip. Now the carriage 37 is moved toward the right by means of the lever 55, and the pin 148 engaging the beveled side 159 of the block 157, lifts it up (see Fig. 21), the carriage farther advancing and the clamp 42 being tripped by the block 152, as before, to place the binding material in position for cutting off and inserting the next strip within the groove of another piece of the sash-frame, which is accomplished by repeating the operations previously described.

The invention thus exemplifies a machine for inserting binding material in grooved pieces of sash-frame, said machine comprising mechanism for inserting the binding material in said groove, mechanism for feeding the material to said inserting mechanism, mechanism for notching the material at the end intermediate the length of the strip to be inserted, and for cutting it to length previous to its insertion.

So far as I am aware, it is broadly new to insert a portion of a strip of binding material in a groove in a piece of grooved sash-frame by mechanical means, and I do not wish to confine myself to the above specific construction and arrangement herein set forth, as modifications in the various details of construction and arrangement may be made without departing from the scope of my invention.

What I claim is:

1. A machine for inserting binding material in grooved pieces of sash-frame comprising means for grasping a strip of binding material, and means for forcing the strip edgewise into the groove in the piece of sash-frame, while said strip is held in the plane of the groove, to insert a portion of said strip in said groove.

2. A machine for inserting binding material in grooved pieces of sash-frame, comprising reciprocating mechanism for directly inserting a portion of the binding material within the groove in a piece of the sash-frame, and bending over the other portion upon said piece adjacent the groove.

3. A machine for inserting binding material in grooved pieces of sash-frame, comprising means for cutting a strip of binding material to a predetermined length, and mechanism for inserting a portion of the strip of material so cut within the groove in the grooved piece of the sash-frame.

4. A machine for inserting binding material in grooved pieces of sash-frame, comprising means for cutting a strip of binding material to a predetermined length, and reciprocating mechanism for inserting a portion of the strip of material so cut within the groove in the grooved piece of the sash-frame.

5. A machine for inserting binding material in grooved pieces of sash-frame, comprising mechanism for cutting a strip of binding material to a predetermined length, and mechanism for inserting a portion of the strip so cut within the groove in the grooved piece of the sash-frame, and bending over the other portion upon said piece.

6. A machine for inserting binding material in grooved pieces of sash-frame, comprising means for cutting a strip of binding material to a predetermined length, and reciprocating mechanism for inserting a portion of the strip of material so cut within the groove in the grooved piece of the sash-frame, and bending over the other portion upon said piece adjacent the groove.

7. A machine for inserting binding material in grooved pieces of sash-frame comprising mechanism for bodily moving a strip of binding material to a position adjacent the groove in a piece of the sash-frame and for inserting a portion of the strip within the groove in said piece and bending over the other portion upon the piece adjacent the groove.

8. A machine for inserting binding material in grooved pieces of sash-frame comprising means for grasping a flexible binding strip, and means for forcing said strip edgewise into the groove, to insert a portion of said strip in said groove.

9. A machine for inserting binding material in grooved pieces of sash-frame comprising means for grasping a strip of binding material, and means for forcing the strip edgewise into the groove, while said strip is held against distortion by the grasping means and in the plane of the groove, to insert a portion of the strip therein.

10. A machine for inserting binding material in grooved pieces of sash-frame, comprising mechanism for feeding the binding material, mechanism for inserting a portion of the strip of binding material within the groove in a piece of the sash-frame, means for cutting the binding material into strips of predetermined lengths previous to their insertion in pieces of sash-frame, and mechanism for notching the material at predetermined distances.

11. A machine for inserting binding material in grooved pieces of sash-frame, comprising the combination of feeding mechanism for the binding material, mechanism for notching the material at predetermined distances, means for cutting the binding material where it is notched into strips, and mechanism for inserting a portion of the strip of binding material within the groove in a piece of the sash-frame.

12. A machine for inserting binding material in grooved pieces of sash-frame, comprising mechanism for inserting a portion of a strip of binding material within the groove in a piece of the sash-frame, mechanism for intermittently feeding the binding material to the inserting mechanism, means for cutting the binding material into strips of predetermined length previous to their insertion in the pieces of the sash-frame, and intermittently operating mechanism for notching the material at predetermined distances so as to form mitered corners for the sash frame.

13. A machine for inserting binding material in grooved pieces of sash-frame, comprising mechanism for inserting a portion of a strip of binding material within the groove in a piece of the sash-frame, and bending over the other portion against said piece, mechanism for feeding the binding material to the inserting mechanism, means for cutting the binding material into strips of predetermined length previous to their insertion in the sash, and mechanism for notching the material at predetermined distances before cutting it.

14. A machine for inserting binding material in grooved pieces of sash-frame, comprising mechanism for inserting a strip of binding material within the groove in a piece of the sash-frame, mechanism for feeding the material to the inserting mechanism, mechanism actuated by the feeding mechanism, for cutting notches in the material at predetermined distances, and means for cutting the material into strips previous to their insertion in the pieces of sash-frame.

15. A machine for inserting binding material in grooved pieces of sash-frame, comprising mechanism for inserting a strip of binding material within the groove in a piece of the sash-frame, mechanism for intermittently feeding the binding material to the inserting mechanism, mechanism actuated by the feeding mechanism for cutting notches in the material at predetermined distances, and means for cutting the material into strips previous to their insertion in the pieces of sash-frame.

16. A machine for inserting binding material in grooved pieces of sash-frame, comprising mechanism for inserting a strip of binding material within the groove in a piece of the sash-frame, reciprocating mechanism for feeding the binding material to the inserting mechanism, reciprocating mechanism for cutting notches in the material at predetermined distances, and means for cutting the material into strips previous to their insertion in the pieces of the sash-frame.

17. A machine for inserting binding material in grooved pieces of sash-frame, comprising mechanism for inserting a strip of binding material within the groove in a piece of the sash-frame, reciprocating mechanism for feeding the binding material to the inserting mechanism, reciprocating mechanism actuated by the feeding mechanism for cutting notches in the material at predetermined distances, and means for cutting the material into strips previous to their insertion in the pieces of the sash-frame.

18. In a machine for inserting binding material in grooved pieces of sash-frame, the combination of releasable feeding mechanism, means for cutting a strip of predetermined length from the binding material after its release from the feeding mechanism, and mechanism for inserting a portion of said strip into the groove in the grooved piece of the sash-frame.

19. In a machine for inserting binding material in grooved pieces of sash-frame, the combination of feeding mechanism, means for operating said feeding mechanism, means on said feeding mechanism for releasably securing the binding material thereto, means for cutting a strip of predetermined length from the binding material, mechanism for inserting a portion of said strip into the groove in a piece of the sash-frame, and means on said inserting mechanism for releasing the securing means on the feeding mechanism.

20. In a machine for inserting binding material in grooved pieces of sash-frame, the combination of feeding mechanism, means for operating said feeding mechanism, means on said feeding mechanism for releasably securing the binding material thereto, means for cutting a strip of predetermined length from the binding material after its release from the feeding mechanism, mechanism for inserting a portion of said strip into the groove in a piece of the sash-frame, and means for causing the engagement of the securing means on the feeding mechanism with the end of the binding material adjacent the severed strip.

21. In a machine for inserting binding material in grooved pieces of sash-frame, the combination of feeding mechanism, means for operating said feeding mechanism, means on said feeding mechanism for releasably securing the binding material thereto, means for cutting a strip of predetermined length from the binding material, mechanism for inserting a portion of said strip in the groove in a piece of the sash-frame, means on said inserting mechanism for releasing the securing means on the feeding mechanism, and means adjacent the inserting mechanism, for causing the engagement of the securing means on the feeding mechanism with the end of the binding material adjacent the severed strip, after the strip has been inserted in the groove in the piece of sash-frame.

22. In a machine for inserting binding material in grooved pieces of sash-frame, the combination of feeding mechanism, means for operating said feeding mechanism, means on said feeding mechanism for releasably securing the binding material thereto, means for cutting a strip of predetermined length from the binding material, mechanism for inserting a portion of said strip into the groove in a piece of the sash-frame, and a trip on said inserting mechanism for releasing the securing means on the feeding mechanism.

23. In a machine for inserting binding material in grooved pieces of sash-frame, the combination of feeding mechanism, means for operating said feeding mechanism, means on said feeding mechanism for releasably securing the binding material thereto, means for cutting a strip of predetermined length from the binding material, mechanism for inserting a portion of said strip into the groove in a piece of the sash-frame, and a trip adjustably mounted on said inserting mechanism for releasing the securing means on the feeding mechanism, for varying the length of the material fed to the inserting mechanism, to accommodate for different lengths of pieces of sash-frame.

24. A machine for inserting binding material in grooved pieces of sash-frame comprising a frame, a supporting table mounted on said frame, a carriage slidably mounted on said table, means on said carriage for securing the end of the binding material thereto, means for operating said carriage, means for cutting a strip of predetermined length from the material fed by said carriage, and mechanism for inserting said strip within the groove in a piece of sash-frame.

25. A machine for inserting binding material in grooved pieces of sash-frame, comprising a frame, a supporting table mounted on said frame, a carriage slidably mounted on said table, releasable means on said carriage for securing the end of the binding material thereto, means for releasing said securing means, means for operating said carriage, mechanism for cutting a strip from the material fed by said carriage after the securing means is released, and mechanism for inserting said strip within the groove in a piece of sash.

26. A machine for inserting binding material in grooved pieces of sash frame, comprising a frame, a supporting table mounted on said frame, a reciprocating carriage slidably mounted on said table, releasable means on said carriage for securing the end of the binding material thereto, a trip for releasing said securing means, means for operating said carriage, means for cutting a strip of predetermined length from the material fed by said carriage, and mechanism for inserting said strip within the groove in a piece of sash.

27. A machine for inserting binding material in grooved pieces of sash-frame, comprising a frame, a supporting table mounted on said frame, a reciprocating carriage slidably mounted on said table, a releasable clamp for securing the end of the binding material to said carriage, a trip for releasing said clamp, means for operating said carriage, means for cutting a strip of predetermined length from the material fed by said carriage, and mechanism for inserting said strip within the groove in a piece of sash.

28. A machine for inserting binding material in grooved pieces of sash-frame, comprising mechanism for inserting a strip of binding material within the groove in the sash, said mechanism comprising a plate, means for clamping the binding material to said plate, means for actuating said plate to insert a portion of the strip of binding material within the groove in a piece of sash-frame while clamped to said plate, and means for automatically releasing said clamping means after a portion of the strip has been inserted in the piece of sash.

29. A machine for inserting binding material in grooved pieces of sash-frame, comprising feeding mechanism, mechanism for cutting a strip of material to desired length, mechanism for inserting one portion of the strip so cut, within the groove in the grooved piece of the sash frame, and bending over the other portion of the strip against said piece adjacent said groove.

30. A machine for inserting binding material in grooved pieces of sash-frame, comprising mechanism for inserting a strip of binding material within the groove in a piece of the sash-frame, said mechanism comprising a reciprocating plate, means for clamping the binding material to said plate, means for actuating said plate to insert a portion of the strip of binding material within the groove in a piece of the sash-frame while clamped to said plate, and means for automatically releasing said clamping means after a portion of the strip has been inserted in said piece.

31. A machine for inserting binding material in grooved pieces of sash-frame, comprising mechanism for inserting a strip of binding material within the groove in a piece of the sash-frame, said mechanism comprising a reciprocating plate, means for clamping the binding material to said plate, means for operating said plate, to insert a portion of the strip of binding material within the groove in the piece of sash-frame while clamped to said plate, and means for automatically releasing said clamping means after the portion of the strip has been inserted in said piece, and means for bending over the other part of the strip against said piece.

32. In a machine for inserting binding material in grooved pieces of sash-frame, the combination of feeding mechanism, and mechanism for cutting notches at predetermined intervals along the strip of binding material, said notching mechanism being operated and controlled by the feeding mechanism.

33. In a machine for inserting binding material in grooved pieces of sash-frame, the combination of feeding mechanism, and reciprocating mechanism for cutting notches at predetermined intervals along the strip of binding material, said notching mechanism being operated and controlled by the feeding mechanism.

34. In a machine for inserting binding material in grooved pieces of sash-frame, the combination of feeding mechanism, and mechanism for cutting notches at predetermined intervals along the strip of binding material, said notching mechanism being intermittently operated and controlled by the feeding mechanism.

35. In a machine for inserting binding material in grooved pieces of sash-frame, the combination of feeding mechanism, mechanism for cutting notches at intervals along the binding material, said notch cutting mechanism comprising a bracket having a guideway shaped to conform to the shape of the material through which said material passes and against which one portion of the material rests, and a notching bar slidably mounted in said bracket, for cutting a notch from that portion of the strip contained within the guideway, and means operated by the feeding mechanism for operating said notching bar.

36. In a machine for inserting binding material in grooved pieces of sash-frame, the combination of feeding mechanism, mechanism for cutting notches at intervals along the binding material, said notch cutting mechanism comprising a bracket, a guideway shaped to conform to the shape of the material through which said material passes and against which one portion of the material rests and a notching bar slidably mounted in said bracket for cutting a notch from that portion of the strip contained within the guideway, and reciprocating means operated by the feeding mechanism, for operating said notching bar.

37. In a machine for inserting binding material in grooved pieces of sash-frame, the combination of feeding mechanism, mechanism for cutting notches at intervals along the binding material, said notch-cutting mechanism comprising a bracket, a guideway shaped to conform to the shape of the material, through which said material passes and against which one portion of the material rests, and a notching bar slidably mounted in said bracket, for cutting a notch from that portion of the strip contained within the guideway, a rod for operating said notching bar, and levers pivotally connected to said bar at either end, said levers actuated by the feeding mechanism to operate said rod.

38. In a machine for inserting binding material in grooved pieces of sash-frame, the combination of means for inserting the material in the groove in a piece of sash-frame, and mechanism for feeding the strip of material to a position adjacent said groove, and means for automatically stopping the feed of the material after a length corresponding to the length of the groove of said piece has been placed in position.

39. In a machine for inserting binding material in grooved pieces of sash-frame, the combination of means for inserting a portion of a strip of the binding material in the groove in a piece of the sash-frame, mechanism for feeding the binding material to a position adjacent said groove, means for automatically stopping the feed of the material after a length corresponding to the length of the groove of said piece has been placed in position, means for cutting off this length of strip, and means for automatically resuming the feed of the material to the inserting mechanism after said strip is inserted in the grooved piece of sash-frame.

40. In a machine for inserting binding material in grooved pieces of sash-frame, the combination of inserting mechanism and feeding mechanism therefor, said feeding mechanism comprising a carriage, a clamp mounted on said carriage for securing the end of the binding material thereto, means for actuating said carriage, means for causing the automatic release of the clamp after a predetermined length of material has been placed in position adjacent the inserting mechanism, mechanism for cutting the binding material to length while it is in position adjacent the inserting mechanism, and means for causing the clamp to automatically engage the end of the binding material adjacent the severed strip after said strip has been inserted within the groove in a piece of sash-frame.

41. In a machine for inserting binding material in grooved pieces of sash-frame, the combination of inserting mechanism and feeding mechanism therefor, said feeding mechanism comprising a reciprocating carriage, a clamp mounted on said carriage for securing the end of the binding material thereto, means for actuating said carriage, means for causing the automatic release of the clamp after a predetermined length of material has been placed in position adjacent the inserting mechanism, mechanism for cutting the binding material to length while it is in position adjacent the inserting mechanism, and means for causing the clamp to automatically engage the end of the binding material adjacent the severed strip after said strip has been inserted within the groove in a piece of sash-frame.

42. In a machine for inserting binding material in grooved pieces of sash-frame, the combination of inserting mechanism and feeding mechanism therefor, said feeding mechanism comprising a reciprocating carriage, a clamp mounted on said carriage for securing the end of the binding material thereto, means for actuating said carriage, means on said inserting mechanism for causing the automatic release of the clamp after a predetermined length of material has been placed in position adjacent the inserting mechanism, mechanism for cutting the binding material to length while it is in position adjacent the inserting mechanism, and means for causing the clamp to automatically engage the end of the binding material adjacent the severed strip after said strip has been inserted within the groove in a piece of sash-frame.

43. A machine for inserting binding material in grooved pieces of sash-frame comprising means for grasping a flexible strip of binding material, and means for forcing the strip edgewise into the groove, while said strip is held against distortion by the grasping means and in the plane of the groove, to insert a portion of the strip therein.

44. A machine for inserting binding material in grooved pieces of sash-frame, comprising a supporting table, an adjustable sash-supporting table mounted upon said supporting table, means for elevating and depressing said sash-supporting table, clamping means mounted upon said sash-supporting table for securing a piece of the sash-frame in position upon the table, mechanism mounted on the supporting table for inserting a strip of binding material within the groove in said piece of sash-frame, and means for operating said inserting mechanism.

45. A machine for inserting binding material in grooved pieces of sash-frame comprising a supporting table, an adjustable sash-supporting table mounted upon said supporting table, means for elevating and depressing said sash supporting table, adjustable clamping means mounted upon said sash-supporting table for securing a piece of the sash-frame in position upon the table, mechanism mounted on the supporting table for inserting a strip of binding material within the groove in said piece and means for operating said inserting mechanism.

46. A machine for inserting binding material in grooved pieces of sash-frame comprising a supporting table, an adjustable sash-supporting table mounted upon said supporting table, means for elevating and depressing said sash-supporting table, clamping means yieldingly supported upon the sash-supporting table, means for actuating said clamping means to secure a piece of the sash-frame upon the table, mechanism mounted on the supporting table and disposed adjacent the sash-supporting table for inserting a strip of binding material within the groove in said piece and means for operating said inserting mechanism.

47. A machine for inserting binding material in grooved pieces of sash-frame, comprising a supporting table, an adjustable sash-supporting table mounted upon said supporting table, means for elevating and depressing said sash-supporting table, clamping means comprising adjustable brackets yieldingly supported upon the sash-supporting table, means for actuating said clamping means to secure a piece of the sash-frame upon the table, mechanism mounted on the supporting table and disposed adjacent the sash-supporting table for inserting a strip of binding material within the groove in said piece, and means for operating said inserting mechanism.

48. A machine for inserting binding material in grooved pieces of sash-frame comprising a supporting table, means for securing a piece of the sash-frame thereto, mechanism for inserting a strip of binding material within the groove in said piece comprising means for releasably securing the strip during its insertion in said groove, and means on said table for releasing said strip-engaging means after a portion of the strip has been inserted in said groove.

49. In a machine for inserting binding material in grooved pieces of sash-frame, the combination of feeding mechanism, and mechanism for cutting notches in the binding material, said notching mechanism comprising a notcher, and means for actuating the same, said notcher comprising a reciprocating bar, and a wedge-shaped member on the actuating means for operating said bar.

50. A machine for inserting binding material in grooved pieces of sash-frame, comprising a supporting table, mechanism for feeding the binding material over said table, a sash-supporting table disposed adjacent said table, means for cutting a strip of material of predetermined length from said binding material after it has been fed to a position adjacent the sash-supporting table, means for clamping a piece of the sash-frame in position upon the sash-supporting table, and mechanism for inserting a portion of the strip of severed material into the groove in said piece, while clamped upon the table.

51. A machine for inserting binding material in grooved pieces of sash-frame, comprising a supporting table, a carriage slidably mounted upon said table, means for securing one end of the binding material to said carriage, means for actuating the carriage to feed the binding material along the table, means for cutting notches at predetermined distances in the binding material during its progress over the table, means for clamping grooved pieces of sash-frame to said table adjacent said carriage, means for cutting through the binding material where it has been previously notched, and mechanism for inserting the strip so cut within the groove in said piece upon the supporting table.

52. In a machine for inserting binding material in grooved pieces of sash-frame, the combination of a supporting table, feeding mechanism comprising a reciprocating carriage mounted on said table, means for actuating said carriage, mechanism for notching the strip of binding material, comprising a notching bar adjustably mounted on said table, a longitudinally extending reciprocating rod for operating said notching bar, a lever pivotally secured at either end of the supporting table and at either end of the rod, whereby said rod will be operated when said carriage strikes either of said levers.

53. In a machine for inserting binding material in grooved pieces of sash-frame, the combination of a supporting table, a plate mounted upon said table and movable transversely thereacross, means for clamping a piece of sash-frame on the table adjacent said plate, means for clamping a strip of binding material to the outer edge of said plate, means for reciprocating the plate to insert a portion of the strip of binding material in the groove in said piece, means for releasing the clamping member after said strip is inserted in the groove, and means for bending over the other portion of the strip on the next reciprocation of said plate.

54. In a machine for inserting binding material in grooved pieces of sash-frame, the combination of a supporting table, a reciprocating carriage mounted on said table, means for actuating said carriage, a reciprocating plate mounted on said table and movable transversely thereacross, said plate having a recess at its front end whereby its front edge may be moved over the reciprocating carriage, while a strip of binding material is on the carriage, means for securing a grooved piece of sash-frame on the table adjacent said plate, a clamping and bending member pivotally mounted adjacent the plate and carriage, whereby the strip of binding material which is on the carriage may be clamped to the forward edge of the plate, and means for moving the plate forwardly along the table and over the carriage, while the material is so clamped, to insert a portion of the strip within the groove in the piece of sash-frame disposed adjacent thereto, and means for automatically releasing the clamping means from engagement with the strip after it is inserted in said piece whereby on the next forward movement of the plate the clamping and bending member will push the portion of the strip already inserted farther into said piece and bend over the other portion of the strip against said piece before it is again automatically released.

55. In a machine for inserting binding material in grooved pieces of sash-frame, the combination of a supporting table, a plate slidably mounted on said table, means for reciprocating said plate, means for securing a grooved piece of sash-frame in position on said table adjacent said plate, a clamping and bending member mounted adjacent the forward edge of said plate adapted to engage the inner side of the upright portion of the strip and secure it to the plate during the insertion of the other portion of the strip in the groove in a piece of sash-frame, and to engage the outer side of the upright portion of the strip so inserted to push it farther into said groove and to bend over the upright portion against said piece.

56. In a machine for inserting binding material in grooved pieces of sash-frame, the combination of a supporting table, a plate slidably mounted on said table, means for reciprocating said plate, means for securing a grooved piece of sash-frame in position on said table adjacent said plate, a clamping and bending member pivotally mounted adjacent the forward edge of said plate and normally held away from the same, a lever for swinging said clamping member into position to clamp a strip of binding material against the plate and having an inclined end, a stop on said supporting table for engaging the inclined end of said lever to release said clamping means, said clamping and bending member having an inclined outer side, whereby the strip may be clamped to a piece of the sash-frame, the plate reciprocated to insert a portion of the strip within the groove in said piece, the clamping means released from engagement with said strip after its insertion, and the plate again reciprocated to bring the inclined side of the bending member against the other portion of the strip to further push into the groove the portion of the strip already inserted, and to bend over the other portion of the strip against said piece.

57. A machine for inserting binding material in grooved pieces of sash-frame comprising means for positioning a strip of binding material adjacent the groove in a piece of sash-frame, means for grasping the strip, and means for inserting a portion of the strip edgewise in the groove while held in the plane thereof.

58. A machine for inserting binding material in grooved pieces of sash-frame comprising means for feeding strips of binding material to a position adjacent the groove in a piece of sash-frame, means for grasping the strip, and means for inserting a portion of the strip edgewise in the groove while held in the plane thereof.

59. In a machine for inserting binding material in grooved pieces of sash-frame the combination of mechanism for inserting a portion of the strip of binding material in the groove in a piece of sash-frame, mechanism for feeding the material to the inserting mechanism comprising a reciprocating carriage and means for guiding the material during the feeding operation comprising a plurality of rollers, one of said rollers being movable toward or away from the other.

60. A machine for inserting binding material in grooved pieces of sash-frame comprising a supporting table, means for securing a grooved piece of sash-frame thereto, mechanism for inserting a portion of a strip of binding material in the groove comprising means for releasably grasping said strip and means for forcing the strip, while so secured, edgewise into the groove.

61. A machine for inserting binding material in grooved pieces of sash-frame comprising a table, means for clamping a piece of the sash-frame to said table, and mechanism for bodily moving a strip of binding material to a position adjacent the groove in said piece for inserting a portion of said strip into said groove and bending over the other portion upon said piece adjacent said groove.

62. A machine for inserting binding material in grooved pieces of sash-frame comprising mechanism for bodily moving a strip of binding material to a position adjacent the groove in a piece of the sash-frame and for inserting a portion of the strip within the groove in said piece and bending over the other portion upon said piece adjacent the groove, and mechanism for feeding the binding material to the inserting mechanism.

In testimony whereof, I affix my signature, in presence of two witnesses.

WILLIAM H. WYMAN.

Witnesses:
  HENRY L. MICHELS,
  ARTHUR PETERSON.

Copies of this patent may be obtained for five cents each, by addressing the "Commissioner of Patents, Washington, D. C."